United States Patent
Hansen et al.

(10) Patent No.: US 11,451,191 B1
(45) Date of Patent: Sep. 20, 2022

(54) SYSTEMS AND METHODS FOR SOLAR FORECASTING

(71) Applicant: 8me Nova, LLC, San Francisco, CA (US)

(72) Inventors: Lukas Mercer Hansen, El Dorado Hills, CA (US); Gautham Ramesh, San Francisco, CA (US)

(73) Assignee: 8ME NOVA, LLC, San Francisco, CA (US)

( * ) Notice: Subject to any disclaimer, the term of this patent is extended or adjusted under 35 U.S.C. 154(b) by 0 days.

(21) Appl. No.: 17/344,706

(22) Filed: Jun. 10, 2021

Related U.S. Application Data (63) Continuation of application No. 17/210,399, filed on Mar. 23, 2021, now Pat. No. 11,063,554.

(51) Int. Cl.
| | | |
|---|---|---|
| *H02J 50/00* | (2016.01) | |
| *H02J 3/38* | (2006.01) | |
| *H02J 3/00* | (2006.01) | |
| *H02S 50/00* | (2014.01) | |
| *H02J 13/00* | (2006.01) | |

(52) U.S. Cl.
CPC .............. *H02S 50/00* (2013.01); *H02J 3/004* (2020.01); *H02J 3/381* (2013.01); *H02J 13/00001* (2020.01); *H02J 2300/24* (2020.01)

(58) Field of Classification Search
CPC . H02S 50/00; H02J 3/004; H02J 3/381; H02J 3/38; H02J 2300/24; H02J 13/00001; H02J 3/00; H02J 13/00
See application file for complete search history.

(56) References Cited

U.S. PATENT DOCUMENTS

| | | |
|---|---|---|
| 9,438,041 B2 | 9/2016 | Roy et al. |
| 9,945,264 B2 | 4/2018 | Wichmann et al. |
| 10,331,089 B2 | 6/2019 | Khabibrakhmanov et al. |
| 10,409,925 B1 | 9/2019 | Hoff |
| 10,756,543 B2 | 8/2020 | Detmers et al. |
| 11,063,554 B1 | 7/2021 | Hansen et al. |
| 11,381,090 B2 | 7/2022 | Srinivasan et al. |
| 2011/0276269 A1 | 11/2011 | Hummel |
| 2014/0200723 A1 | 7/2014 | Roy et al. |
| 2016/0172859 A1 | 6/2016 | Marhoefer |
| 2017/0331292 A1 | 11/2017 | Rive et al. |
| 2018/0232557 A1 | 8/2018 | Chang et al. |

(Continued)

OTHER PUBLICATIONS

U.S. Appl. No. 17/210,399 Notice of Allowance dated May 17, 2021.

(Continued)

*Primary Examiner* — Robert L Deberadinis
(74) *Attorney, Agent, or Firm* — Foley & Lardner LLP (57) ABSTRACT

The present disclosure provides a method for controlling a solar power plant comprising a plurality of solar modules. The method may comprise (a) obtaining irradiance data at a first time and a second time from a plurality of sensors disposed among or adjacent to the plurality of solar modules; (b) processing the irradiance data at the first time and the second time to generate an output that indicates whether one or more solar modules of the plurality of solar modules will be covered by a shadow or shade at a third time; (c) generating, based at least in part on the output, a power output prediction for the plurality of solar modules at the third time; and (d) adjusting a power output of the solar power plant based at least in part on the power output prediction.

36 Claims, 6 Drawing Sheets

(56) References Cited

U.S. PATENT DOCUMENTS

2019/0204405 A1 7/2019 Arliaud et al.
2021/0285415 A1 9/2021 Vamvas

OTHER PUBLICATIONS

"Guide to Purchasing Green Power, Renewable Electricity, Renewable Energy Certificates, and On-Site Renewable Generation", Office of Air (6202J) EPA430-K-04-015 www.epa.gov/greenpower Mar. 2010 Updated: Sep. 2018, downloaded Jul. 26, 2022.

SYSTEMS AND METHODS FOR SOLAR FORECASTING

CROSS-REFERENCE

This application is a continuation of U.S. patent application Ser. No. 17/210,399, filed Mar. 23, 2021, which is entirely incorporated herein by reference.

BACKGROUND

The output power of a solar power plant may depend on atmospheric conditions and phenomena between the sun and the solar modules of the power plant, including the presence or absence of clouds, fog, dust, and the like. For example, solar modules may generate less power in cloudy conditions and more power in clear conditions. This variability is one disadvantage of the use of solar power plants in power grids, where predictability of power supply is valued to maintain stable grid conditions. Because predictability of power supply has value to grid operators, it may be desirable to forecast solar output. Accurately forecasting solar output may enable solar plant and grid operators to take steps to mitigate the effects of variations in solar output due to changing atmospheric conditions.

SUMMARY

The present disclosure provides systems and methods for forecasting short-term variations in the output of a solar power plant due to changing atmospheric conditions. In some embodiments of the present disclosure, a system obtains irradiance data from a plurality of sensors disposed among or adjacent to a plurality of solar modules of the power plant. The system can obtain the irradiance data continuously or at regular intervals. If the irradiance measured by a particular sensor is less than the irradiance measured by other sensors in the area, the solar modules near that sensor may be covered by a shadow (e.g., a cloud shadow) or shade. The system can process irradiance data collected at a first time and at a second time to generate an output that indicates whether one or more solar modules of the plurality of solar modules will be covered by a shadow at a third time. The processing may involve determining the position of the shadow at the first time and at the second time. From these positions and times, the system can determine the velocity of the shadow. And from the velocity of the shadow and its position at the second time, the system can predict (e.g., using a vector or inertia model) its position at the third time and its resulting impact on the irradiance of the solar modules. The output may be a data structure containing the predicted irradiance of each solar module at the third time. The system can use this output to more accurately predict the instantaneous power output of the solar power plant at the third time.

Thereafter, the predicted power output can be used to adjust the actual power output of the solar power plant in accordance with desired grid conditions. For example, if the predicted power output of the plant is less than the current power output of the plant (e.g., due to predicted cloud coverage), but the grid operator wants to maintain the current power output, the system can account for the difference by increasing the power output by an energy storage system (e.g., a battery energy storage system) at the plant. Alternatively, if a reduction in power output is permissible to the grid operator, the system can slowly ramp down the power output of the plant, which may be preferable to a sudden decrease in power output. In some cases, the system may merely transmit a notification to the grid operator about the impending decrease in power output.

Alternatively or additionally, the system can use the output to adjust the orientation of the solar modules. For example, if a particular solar module is expected to be covered by a cloud shadow, it may be desirable to orient the solar module parallel to the ground, because diffuse light may exceed direct light in cloudy conditions.

The system described above provides numerous improvements in the technical field of solar power generation. In particular, the system uses highly localized and real-time irradiance data to generate cloud predictions, which may allow the system to more accurately predict and more quickly adjust the power output of a solar power plant according to desired grid conditions.

In an aspect, the present disclosure provides a method for controlling a solar power plant comprising a plurality of solar modules. The method may comprise (a) obtaining irradiance data at a first time and a second time from a plurality of sensors disposed among or adjacent to said plurality of solar modules; (b) processing said irradiance data at said first time and said second time to generate an output that indicates whether one or more solar modules of said plurality of solar modules will be covered by a shadow or shade at a third time; (c) generating, based at least in part on said output, a power output prediction for said plurality of solar modules at said third time; and (d) adjusting a power output of said solar power plant based at least in part on said power output prediction.

In some embodiments, (d) comprises adjusting a ramp rate of said power output of said solar power plant. In some embodiments, said third time is at most about 30 minutes after said second time. In some embodiments, said second time is at most about 5 minutes after said first time. In some embodiments, (c) comprises determining a position and a shape of said shadow or shade at said first time and said second time. In some embodiments, determining said position and said shape comprises determining a location of a leading and a trailing edge of said shadow or shade at said first time and said second time. In some embodiments, determining said location of said leading and said trailing edge comprises using an edge detection algorithm. In some embodiments, (c) comprises determining a velocity of said shadow or shade. In some embodiments, determining said velocity comprise using an inertia model or vector analysis. In some embodiments, the method further comprises (e) notifying a grid operator of said power output prediction.

In another aspect, thee present disclosure provides a method for controlling a solar power plant comprising a plurality of solar modules and an energy storage system. The method may comprise (a) obtaining irradiance data at a first time and a second time from a plurality of sensors disposed among or adjacent to the plurality of solar modules; (b) processing the irradiance data at the first time and the second time to generate an output that indicates whether one or more solar modules of the plurality of solar modules will be covered by a shadow or shade at a third time; (c) generating, based at least in part on the output, a power output prediction for the plurality of solar modules at the third time; (d) determining that the power output prediction of the plurality of solar modules at the third time is different than a current power output of the plurality of solar modules; and (e) adjusting a power output of the energy storage system to maintain a total power output of the solar power plant.

In another aspect, thee present disclosure provides a method for controlling a solar power plant comprising a plurality of solar modules. The method may comprise (a) obtaining irradiance data at a first time and a second time from a plurality of sensors disposed among or adjacent to the plurality of solar modules; (b) processing the irradiance data at the first time and the second time to generate an output that indicates whether one or more solar modules of the plurality of solar modules will be covered by a shadow or shade at a third time; (c) generating, based at least in part on the output, a power output prediction for the plurality of solar modules at the third time; and (d) notifying a grid operator of said power output prediction.

In another aspect, thee present disclosure provides a method for predicting whether one or more solar modules of a plurality of solar modules will be covered by a shadow or shade. The method may comprise (a) providing a plurality of sensors configured to measure electric power, wherein each sensor of said plurality of sensors is disposed at an output of an inverter of a plurality of inverters, and wherein each inverter of the plurality of inverters is connected to a subset of the plurality of solar modules; (b) using the plurality of sensors, determining power outputs of the plurality of inverters at a first time and a second time; (c) processing the power outputs of the plurality of inverters at the first time and the second time to generate an output that indicates whether the one or more solar modules of the plurality of solar modules will be covered by a shadow or shade at a third time; and (d) adjusting an orientation of the one or more solar modules in response to the output.

In some embodiments, the third time is at most about 30 minutes after the second time. In some embodiments, the second time is at most about 5 minutes after the first time. In some embodiments, (c) comprises determining a position and a shape of the shadow or shade at the first time and the second time. In some embodiments, determining the position and the shape comprises determining a location of a leading and a trailing edge of the shadow or shade at the first time and the second time. In some embodiments, determining the location of the leading and the trailing edge comprises using an edge detection algorithm. In some embodiments, (c) comprises determining a velocity of the shadow or shade. In some embodiments, determining the velocity comprise using an inertia model or vector analysis. In some embodiments, (d) comprises orienting the one or more solar modules substantially parallel to the ground. In some embodiments, (d) is performed immediately prior to the shadow or shade reaching the one or more solar modules. In some embodiments, the method further comprises, subsequent to (d), orienting the one or more solar modules toward the sun after the shadow or shade passes the one or more solar modules. In some embodiments, generating the output further comprises using wind speed data. In some embodiments, the plurality of sensors are components of a supervisory control and data acquisition (SCADA) system. In some embodiments, the method further comprises obtaining data from irradiance meters and using the data in (c). In some embodiments, the output comprising a predicted irradiance of each solar module of the plurality of solar modules at the third time.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values.

For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The present disclosure provides systems and methods for forecasting short-term variations in the output of a solar power plant due to changing atmospheric conditions. In some embodiments of the present disclosure, a system obtains irradiance data from a plurality of sensors disposed among or adjacent to a plurality of solar modules of the power plant. The system can obtain the irradiance data continuously or at regular intervals. If the irradiance measured by a particular sensor is less than the irradiance measured by other sensors in the area, the solar modules near that sensor may be covered by a shadow (e.g., a cloud shadow) or shade. The system can process irradiance data collected at a first time and at a second time to generate an output that indicates whether one or more solar modules of the plurality of solar modules will be covered by a shadow at a third time.

The output may be a data structure containing the predicted irradiance of each solar module at the third time. The system can use this output to more accurately predict the instantaneous power output of the solar power plant at the third time.

Figure 1:
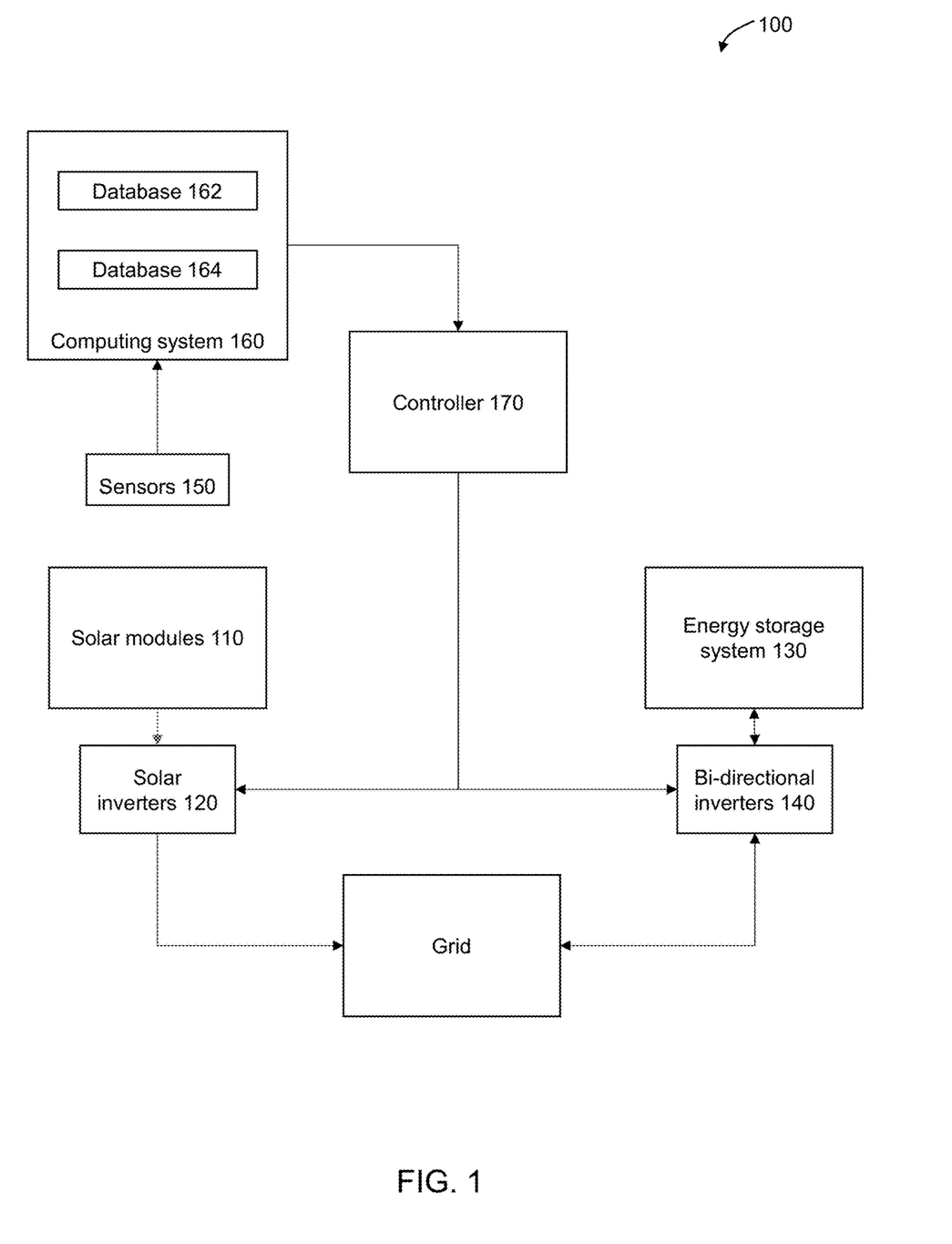
FIG. 1 schematically illustrates a solar power plant, according to some embodiments of the present disclosure.

FIG. 1 schematically illustrates a solar power plant 100, according to some embodiments of the present disclosure. The solar power plant 100 may have solar modules 110, solar inverters 120, an energy storage system 130, bi-directional inverters 140, sensors 150, a computing system 160, and a controller 170. The solar modules 110 and the energy storage system 130 may be connected to the grid through the inverters 120 and the bi-directional inverters 140.

The solar modules 110 may be arranged in a grid. Each solar module may have one or more photovoltaic cells that convert light to electric power. The photovoltaic cells may be multi-, mono- or amorphous silicon cells, cadmium telluride cells, perovskite cells, or the like. The photovoltaic cells may be single junction or multi junction cells. The solar modules 110 may be mono-facial or bifacial.

The inverters 120 may be direct current-to-alternating current (DC-to-AC) inverters. The inverters 120 can convert DC power generated by the solar modules 110 to AC power for the grid.

The energy storage system 130 may be a compressed air system, a pumped water system, or a battery-based system. The energy storage system 130 can store excess power generated by the solar modules 110 or available from the grid (e.g., during low demand periods). Additionally or alternatively, the energy storage system 130 can be discharged in order to provide additional power to the grid (e.g., when grid demand is high, or when the power output of the solar modules is low). The bi-directional inverters 140 may be DC-to-AC and AC-to-DC inverters, that facilitate discharging and charging of the energy storage system 130, respectively.

The sensors 150 may include irradiance meters. The sensors 150 may also include wind speed sensors, precipitation sensors, humidity sensors, and the like. The sensors 150 may be communicatively coupled to the computing system 160. The computing system 160 may have a database 162 and a processor 164. The computing system 160 can store the data generated by the sensors 150 in the database 162. The processor 164 can obtain the data from the database 162 and process the data to generate predictions, including irradiance and/or cloud predictions, power predictions, and the like. The process of generating these predictions is described in greater detail in FIGS. 2-5. The controller 170 can use the predictions generated by the computing system 160 to control the power output of the solar modules 110 and the energy storage system 130. For example, if the predictions indicate that cloud coverage will reduce the power output of the solar modules 110, the controller 170 can send control signals that cause the energy storage system 130 and bi-directional inverters 140 to discharge power to the grid. Or, if the predictions indicate that the solar modules 110 will generate excess power, the controller 170 can send control signals that cause one or more of the solar modules 110 to disconnect from the grid and connect instead to the energy storage system 130 to charge the energy storage system 130 with the excess power. The controller 170 can also control the orientation of the solar panels.

The computing system 160 can be implemented on one or more computing devices. The computing devices can be servers, desktop or laptop computers, electronic tablets, mobile devices, or the like. The computing devices can be located in one or more locations. The computing devices can have general-purpose processors, graphics processing units (GPU), application-specific integrated circuits (ASIC), field-programmable gate-arrays (FPGA), or the like. The computing devices can additionally have memory, e.g., dynamic or static random-access memory, read-only memory, flash memory, hard drives, or the like. The memory can be configured to store instructions that, upon execution, cause the computing devices to implement the functionality of the subsystems. The computing devices can additionally have network communication devices. The network communication devices can enable the computing devices to communicate with each other and with any number of user devices, over a network. The network can be a wired or wireless network. For example, the network can be a fiber optic network, Ethernet® network, a satellite network, a cellular network, a Wi-Fi® network, a Bluetooth® network, or the like. In other implementations, the computing devices can be several distributed computing devices that are accessible through the Internet. Such computing devices may be considered cloud computing devices.

Figure 2:
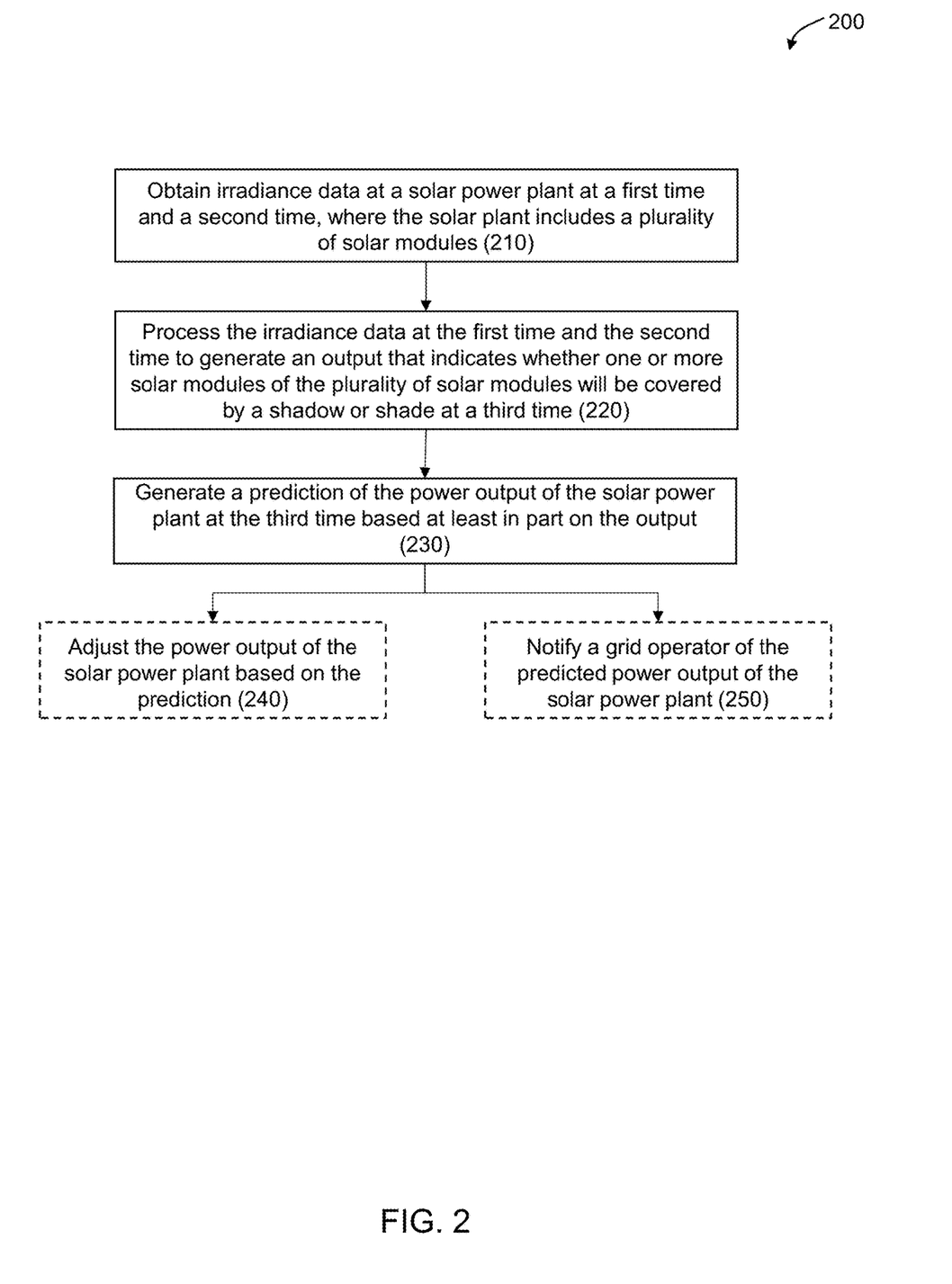
FIG. 2 is a flow chart of a process for controlling the power output of the solar power plant in accordance with predicted irradiance at the solar power plant, according to some embodiments of the present disclosure.

FIG. 2 is a flow chart of a process 200 for controlling the power output of a solar power plant in accordance with predicted irradiance at the power plant, according to some embodiments of the present disclosure. The process 200 can be performed by a system of one or more appropriately programmed computers in one or more locations (e.g., the computing system 160 and the controller 170 of FIG. 1).

The solar power plant may have plurality of solar modules. The solar modules may be arranged in a grid. Each solar module may have one or more photovoltaic cells that convert light to electric power. The photovoltaic cells may be multi-, mono- or amorphous silicon cells, cadmium telluride cells, perovskite cells, or the like. The photovoltaic cells may be single junction or multi-junction cells. The solar modules may be mono-facial or bifacial. The solar modules may also have power electronics. For example, each solar module—or a subset of solar modules—may have a DC-to-DC converter and an inverter. The DC-to-DC converters can adjust the voltage of the DC power generated by the solar modules, and the inverters can convert the DC power generated by the solar modules to AC power. Each solar module may also have a controller and a motor for adjusting the orientation of the solar module with respect to the sun.

The solar power plant may also have an energy storage system. The energy storage system may be a compressed air system, a pumped water system, or a battery-based system, for example. The energy storage systems can store excess power generated by the solar power plant when grid demand is low and supplement power generated by the solar modules when grid demand is high.

In an operation of the process 200, the system can obtain irradiance data from a plurality of sensors at a first time and at a second time (210). The sensors may be disposed among or adjacent to the solar modules. For example, the sensors may be disposed between the solar modules and along or adjacent to the perimeter of the grid of solar modules. There may be at least about 1 solar module per sensor, 2 solar modules per sensor, 3 solar modules per sensor, 4 solar modules per sensor, 5 solar modules per sensor, 10 solar modules per sensor, 20 solar modules per sensor, or more. The sensors may be irradiance meters. Alternatively, the inverters that are used to covert the DC power generated by the solar modules to AC power may be used as sensors. The inverters may be disposed among the array of solar modules, and a particular inverter may be connected to a subset of adjacent solar modules. The inverters may have built-in sensors that are configured to measure electric power. For example, the sensors may be components of a supervisory control and data acquisition (SCADA) system of the inverters. The irradiance of the solar modules that are connected to a particular inverter can be inferred from the power output of that inverter. The use of inverters as sensors may be advantageous because it may allow the implementation of the forecasting system described herein without specialized or dedicated hardware.

The second time may be at least about 1 minute, 2 minutes, 3 minutes, 4 minutes, 5 minutes, 10 minutes, 15 minutes, 30 minutes, 45 minutes, 1 hour, or more after the first time. The second time may be at most about 1 hour, 45 minutes, 30 minutes, 15 minutes, 10 minutes, 5 minutes, 4 minutes, 3 minutes, 2 minutes, 1 minute, or less after the first time.

The system can process the irradiance data at the first time and the second time to generate an output that indicates whether one or more solar modules will be covered by a shadow or shade at a third time (220). The shadow may be caused by a cloud or other atmospheric condition or phenomena (e.g., fog, dust, smog, or the like). The output may be or include a data structure that comprises the predicted or expected irradiance of each solar module at the third time. The data structure may be a map that is superimposed on a representation of the grid of solar modules. Alternatively, the output may merely indicate which solar modules are expected to be covered by the shadow.

The third time may be at least about 1 minute, 2 minutes, 3 minutes, 4 minutes, 5 minutes, 10 minutes, 15 minutes, 30 minutes, 45 minutes, 1 hour, 2 hours, or more after the second time. The second time may be at most about 2 hours, 1 hour, 45 minutes, 30 minutes, 15 minutes, 10 minutes, 5 minutes, 4 minutes, 3 minutes, 2 minutes, 1 minute, or less after the second time.

Figure 3:
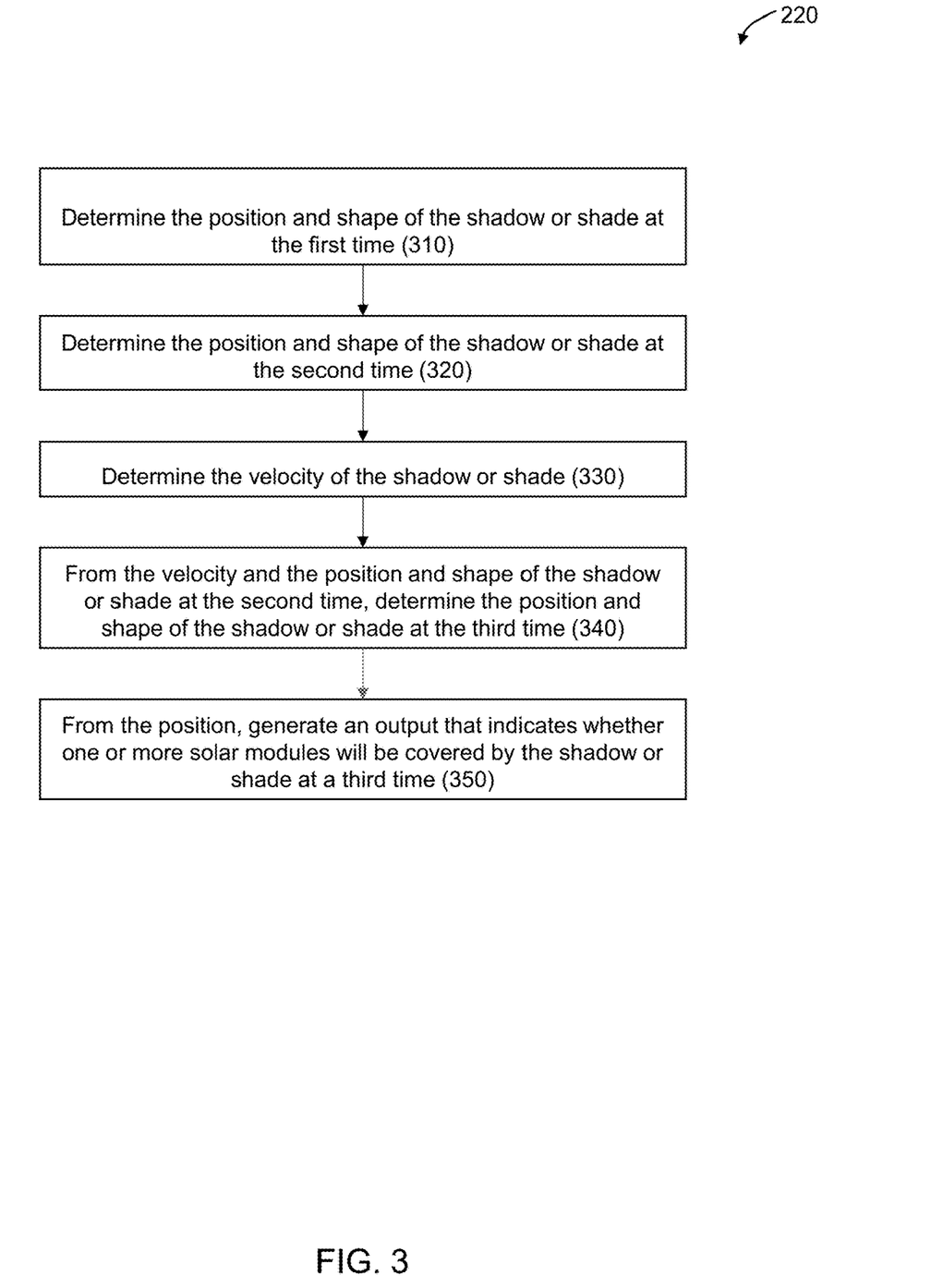
FIG. 3 is a flow chart of certain sub-operations of the process of FIG. 2, according to some embodiments of the present disclosure.

FIG. 3 is a flow chart of the sub-operations of operation 220, according to some embodiments of the present disclosure. The system can determine the position and shape of the shadow at the first time (310). Determining the position and shape of the shadow may comprise determining the edges of the shadow, including the leading and trailing edges and any other edges. The system can determine the edges of the shadow by processing the irradiance data with an edge detection algorithm. The edge detection algorithm may compute derivatives of the irradiance values in the irradiance data to determine locations in which the irradiance values exhibit a high rate of change. Such locations may correspond to the edges of the shadow. Alternatively, the edge detection algorithm may be a supervised machine learning algorithm (e.g., a convolutional neural network). The supervised machine learning algorithm may be trained to detect the edges of the shadow. The supervised machine learning algorithm may be trained on labeled training examples. The labeled training examples may be, for example, maps of irradiance data in which the edges of the shadows or shade have been identified. The system can then determine the position and shape of the shadow at the second time (320). Operation 320 may be substantially the same as operation 310.

Based on the position and shape of the shadow at the first time, the position and shape of the shadow at the second time, and the difference between the first time and the second time, the system can determine the velocity of the shadow (330). The system can predict the position and shape of the shadow at the third time based at least in part on its velocity and its position and shape at the second time (340). Determining the position and shape at the third time may comprise applying an inertia model or vector analysis to the velocity and the position at the second time. In predicting the position and shape of the shadow at the third time, the system can also consider the current wind speed.

Based at least in part on the predicted position and shape of the shadow at the third time, the system can generate the output that indicates whether one or more solar modules will be covered by the shadow at the third (350). As mentioned above, the output may be or include a data structure that comprises the predicted or expected irradiance of each solar module at the third time. The expected irradiance of a particular solar module at the third time may be inferred from the actual irradiance of a similarly-situated solar module at the second time (e.g., from the actual irradiance of a solar module that was covered by the same shadow that is expected to cover the particular solar module at the third time). Alternatively, the output may merely indicate which solar modules are expected to be covered by the shadow.

Figure 4:
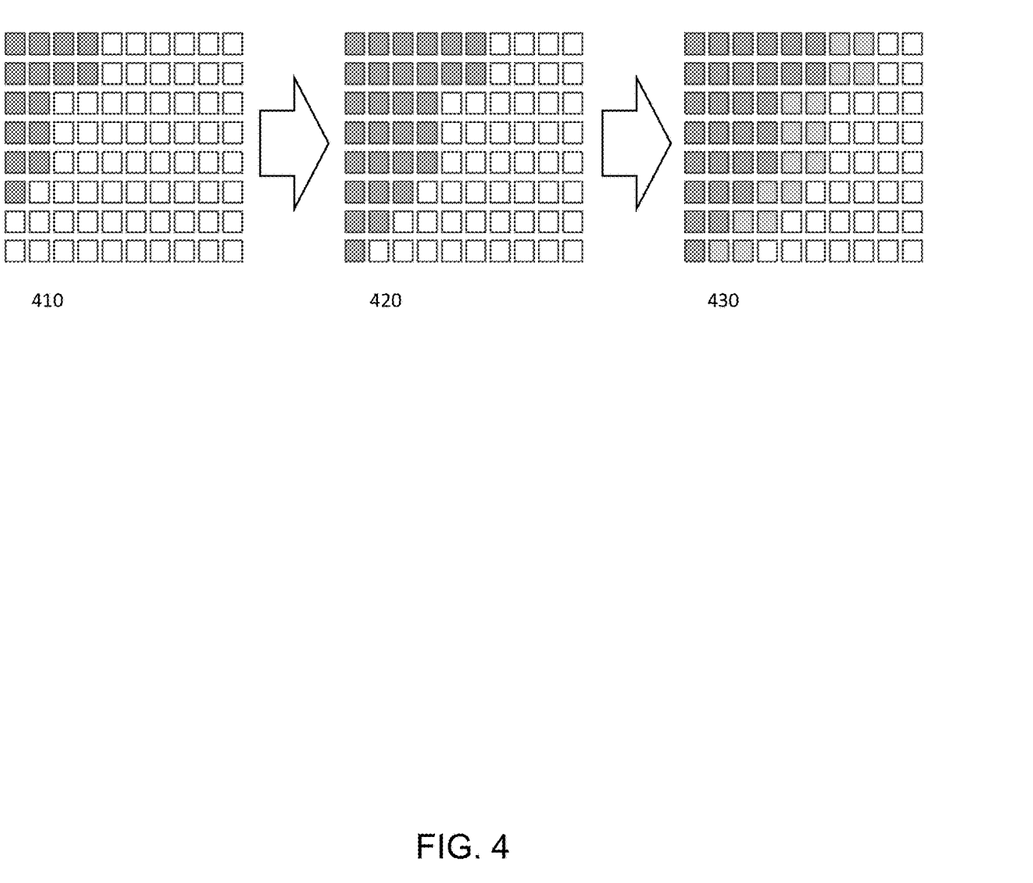
FIG. 4 graphically illustrates the process of FIG. 3.

FIG. 4 graphically illustrates the process 300. 410 represents the output of an array of irradiance meters at a first time, with the shaded boxes representing lower irradiance values. 420 represents the output of the array of irradiance meters at a second time. In 420, additional boxes are shaded, indicating the movement of shadow to right. 430 represents predicted irradiance values at a third time.

Returning to FIG. 2, the system can generate a prediction of the power output of the solar power plant at the third time based at least in part on the output generated in operation 220 (230). In general, the power output of a particular solar module may be defined by the equation:

$$P = A \times I \times R \times PR,$$

where P is the power output of the solar module in watts, A is the area of the solar module in square meters, I is the irradiance of the solar module in watts per square meter, R is the yield of the solar module, and PR is the performance ratio. The yield of the solar module may be the efficiency of the solar module in converting light to power. The performance ratio of the solar module may account for other types of losses, including inverter losses, temperature losses, cable losses, and the like. The yield and performance ratios of the solar modules may be determined empirically. The yield and performance ratios may vary depending on the age of the solar modules and numerous other factors (e.g., irradiance). Such factors may be considered when computing the expected power outputs of the solar modules.

The power output of the solar power plant may be the sum of the power outputs of the individual solar modules. To predict the power output of the solar power plant at the third time, the system can use the predicted irradiance of each solar module at the third time in the above-mentioned equation.

In some cases, the predicted power output of the solar power plant at the third time may be different than the actual power output of the power plant at the second time. For example, the predicted power output at the third time may be less than the actual power output at the second time due to an incoming cloud shadow. Alternatively, the predicted power output at the third time may be greater than the actual power output of the power plant at the second time due to an outgoing cloud shadow. It may be desirable to prevent a change in the power output of the power plant or to increase or decrease the power output slowly rather than abruptly.

Accordingly, in some embodiments, the system can take one or more actions to (i) prevent the power output of the power plant from changing or (ii) reduce the rate of change of the power output (240). For example, the system can send a control signal to an energy storage system at the power plant. The control signal may cause the energy storage system to store excess power generated by the solar modules, or it may cause the energy storage system to provide power to supplement the power generated by the solar modules. Utilizing the energy storage system in this way may ensure that the power output of the solar power plant remains steady over time. In some cases, an increase or decrease in the power output of the solar power plant may be acceptable. In such cases, the energy storage system may be used to slowly ramp the power output of the solar power plant up or down, which may be more desirable than an abrupt change. Even in the absence of an energy storage system, the power output of the solar array itself can be reduced to less than it is capable of delivering (e.g., by instructing the inverters to limit their power output).

In some embodiments, the system can merely notify a grid operator of the expected increase or decrease in power output (250). Thereafter, the grid operator can address the change in power output as it sees fit.

The solar modules described herein may be disposed on solar trackers. The solar trackers can be used to adjust the orientation of the solar modules to minimize the angle of incidence between the solar modules and incoming sunlight. On clear days, the solar trackers may orient the solar modules so that they face the sun directly. However, on cloudy days, the solar trackers may instead orient the solar modules parallel to the ground, because the intensity of diffuse light may exceed the intensity of direct light on cloudy days.

The solar trackers may allow the solar modules to rotate about one or two axes. The solar trackers may have motors to facilitate the rotation. A solar tracking algorithm may control the motors. The solar tracking algorithm may be a date and time-based algorithm, or it may use sensor inputs. The solar tracking algorithm may be a machine learning algorithm. For example, the solar tracking algorithm may be a reinforcement learning algorithm.

Figure 5:
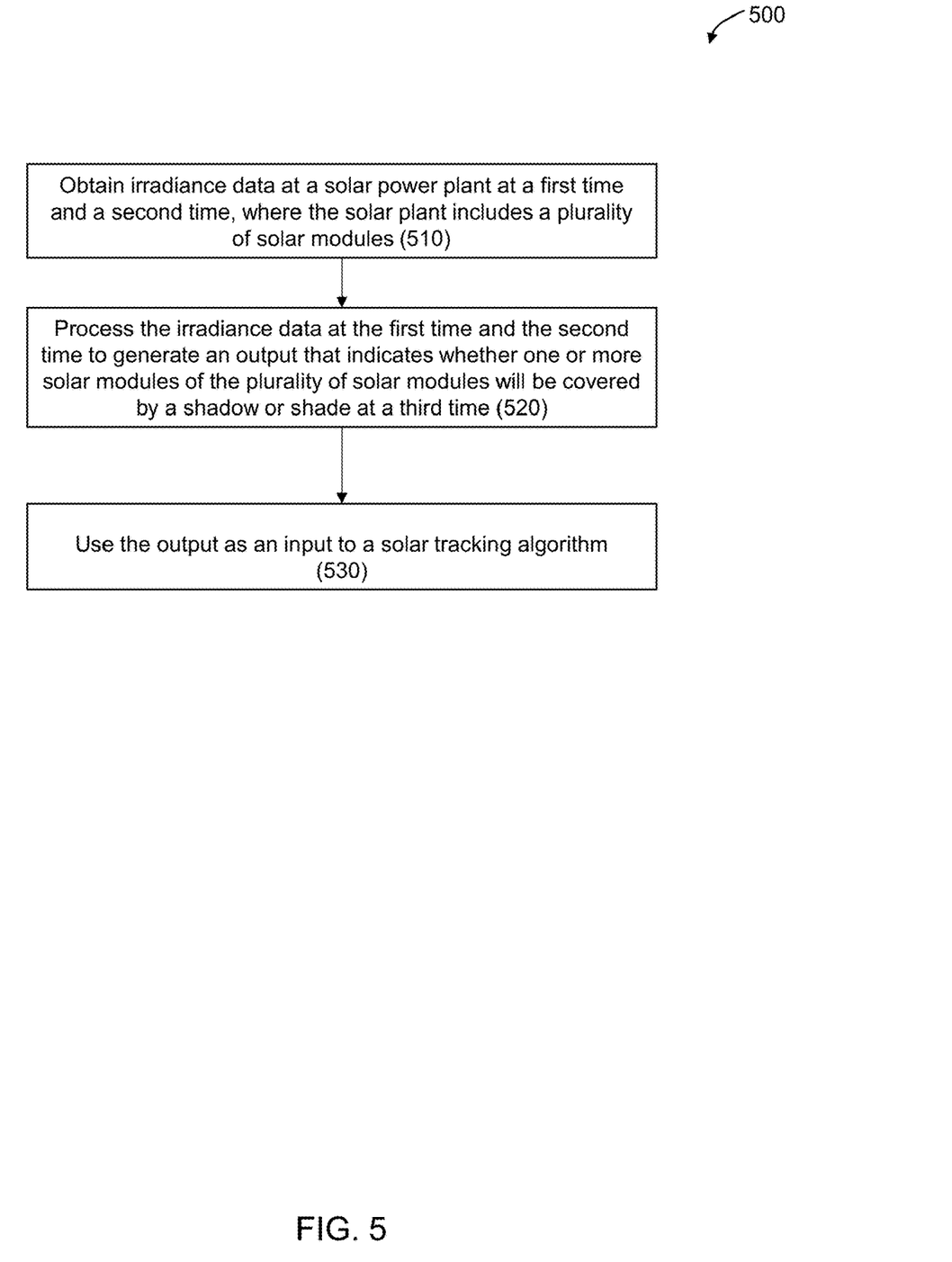
FIG. 5 is a flow chart of a process for adjusting the orientation of solar modules at the solar power plant, according to some embodiments of the present disclosure.

FIG. 5 is a flow chart of a process 500 for adjusting the orientation of solar modules, according to some embodiments of the present disclosure. The process 500 can be performed by a system of one or more appropriately programmed computers in one or more locations (e.g., the computing system 160 and the controller 170 of FIG. 1).

The system can obtain irradiance data from a plurality of sensors at a first time and at a second time (510). The sensors may be irradiance meters. Additionally or alternatively, the inverters that convert DC power generated by the solar modules to AC power may serve as sensors. Operation 510 of the process 500 may be substantially the same as the operation 210 of the process 200.

The system can process the irradiance data at the first time and the second time to generate an output that indicates whether one or more solar modules will be covered by a shadow or shade at a third time (520). The output may be or include a data structure that comprises the predicted or expected irradiance of each solar module at the third time. The data structure may be a map that is superimposed on a representation of the grid of solar modules. Alternatively, the output may merely indicate which solar modules are expected to be covered by the shadow. Operation 520 of the process 500 may be substantially the same as the operation 510 of the process 200.

The system can then use the output of operation 520 as input to the solar tracking algorithm described above (530). The output of the solar tracking algorithm may be a control signal that causes one or more solar trackers to adjust the orientation of one or more solar modules based on predicted cloud patterns. If the system predicts that particular solar modules will be covered by a cloud shadow at a future time, the solar tracking algorithm can adjust the orientation of those solar modules to be substantially parallel to the ground. This may be desirable because the intensity of diffuse light may exceed the intensity of direct light in cloudy conditions. If the system predicts that particular solar modules will not be covered by a cloud shadow at a future time, the solar tracking algorithm can adjust the orientation of those solar modules to be perpendicular to the sun. If the system predicts partial or broken cloud cover, the solar tracking algorithm can adjust the orientation of the solar modules to face bright areas between clouds. The system can make these adjustments immediately prior to the leading or trailing edge of a cloud shadow reaching the relevant solar modules. In some cases, the velocity of clouds may be so high that it is impossible or uneconomic to adjust the orientation of the solar modules. In such cases, solar tracking may be halted.

Machine Learning

The present disclosure describes an edge detection algorithm for detecting the edges of a cloud shadow. The edge detection algorithm may be a supervised machine learning algorithm. The supervised machine learning algorithm may be trained on historical data. The historical data may include (i) instances of irradiance data at a particular time and (ii) for each instance, the manually identified edges of any cloud shadows in the irradiance data. The supervised machine learning algorithm may be trained by providing the instances of irradiance data to an untrained or partially trained version of the algorithm to generate predicted outputs that indicate the edges of any cloud shadows in the irradiance data. The predicted outputs can be compared to the known outputs (i.e., the manually identified edges of any cloud shadows in the irradiance data), and if there is a difference, the parameters of the supervised machine learning algorithm can be updated. The supervised machine learning algorithm may be a regression algorithm, a support vector machine, a decision tree, a neural network, or the like. In cases in which the machine learning algorithm is a regression algorithm, the weights may be regression parameters.

In some cases, the supervised machine learning algorithm may be a neural network. Neural networks may employ multiple layers of operations to predict one or more outputs, e.g., the edge of a shadow. Neural networks may include one or more hidden layers situated between an input layer and an output layer. The output of each layer can be used as input to another layer, e.g., the next hidden layer or the output layer. Each layer of a neural network may specify one or more transformation operations to be performed on input to the layer. Such transformation operations may be referred to as neurons. The output of a particular neuron may be a weighted sum of the inputs to the neuron, adjusted with a bias and multiplied by an activation function, e.g., a rectified linear unit (ReLU) or a sigmoid function. Training a neural network may involve providing inputs to the untrained neural network to generate predicted outputs, comparing the predicted outputs to expected outputs, and updating the algorithm's weights and biases to account for the difference between the predicted outputs and the expected outputs. Specifically, a cost function may be used to calculate a difference between the predicted outputs and the expected outputs. By computing the derivative of the cost function with respect to the weights and biases of the network, the weights and biases may be iteratively adjusted over multiple cycles to minimize the cost function. Training may be complete when the predicted outputs satisfy a convergence condition, e.g., a small magnitude of calculated cost as determined by the cost function.

The neural network may be a convolutional neural network (CNN). CNNs are neural networks in which neurons in some layers, called convolutional layers, receive input from only a small portion of the input data set (e.g., a small area of irradiance data). These small portions may be referred to as the neurons' receptive fields. Each neuron in such a convolutional layer may have the same weights. In this way, the convolutional layer can detect certain features in any portion of the input data set. CNNs may also have pooling layers that combine the outputs of neuron clusters in convolutional layers and fully connected layers that are similar to traditional layers in a feed-forward neural network. CNNs may be particularly adept at classifying images or image-like data (e.g., a map of irradiance data).

Alternatively, the edge detection algorithm may be an unsupervised machine learning algorithm. The unsupervised machine learning algorithm may be capable of identifying patterns in irradiance data (e.g., areas of the irradiance data that exhibit a high rate of change). The unsupervised machine learning algorithm may be a clustering algorithm, an isolation forest, an autoencoder, or the like.

The present disclosure also describes a solar tracking algorithm. The solar tracking algorithm may be a reinforcement learning algorithm. The reinforcement learning algorithm may seek an optimal solution to a problem by balancing exploration of uncharted territory with exploitation of current knowledge. In reinforcement learning, labeled input-output pairs need not be used. Instead, an action is chosen from a set of available actions. The action may result in a new environmental state (i.e., a new solar module orientation). The new environmental state may have a reward associated with it, and the reward may be positive or negative depending on whether the new state is better (i.e., if the solar module generates more power) or worse (i.e., if the solar module generates less power) than the previous state. The goal of the agent may be to collect as much reward as possible, i.e., optimize the output power of the solar module.

Computer Systems

Figure 6:
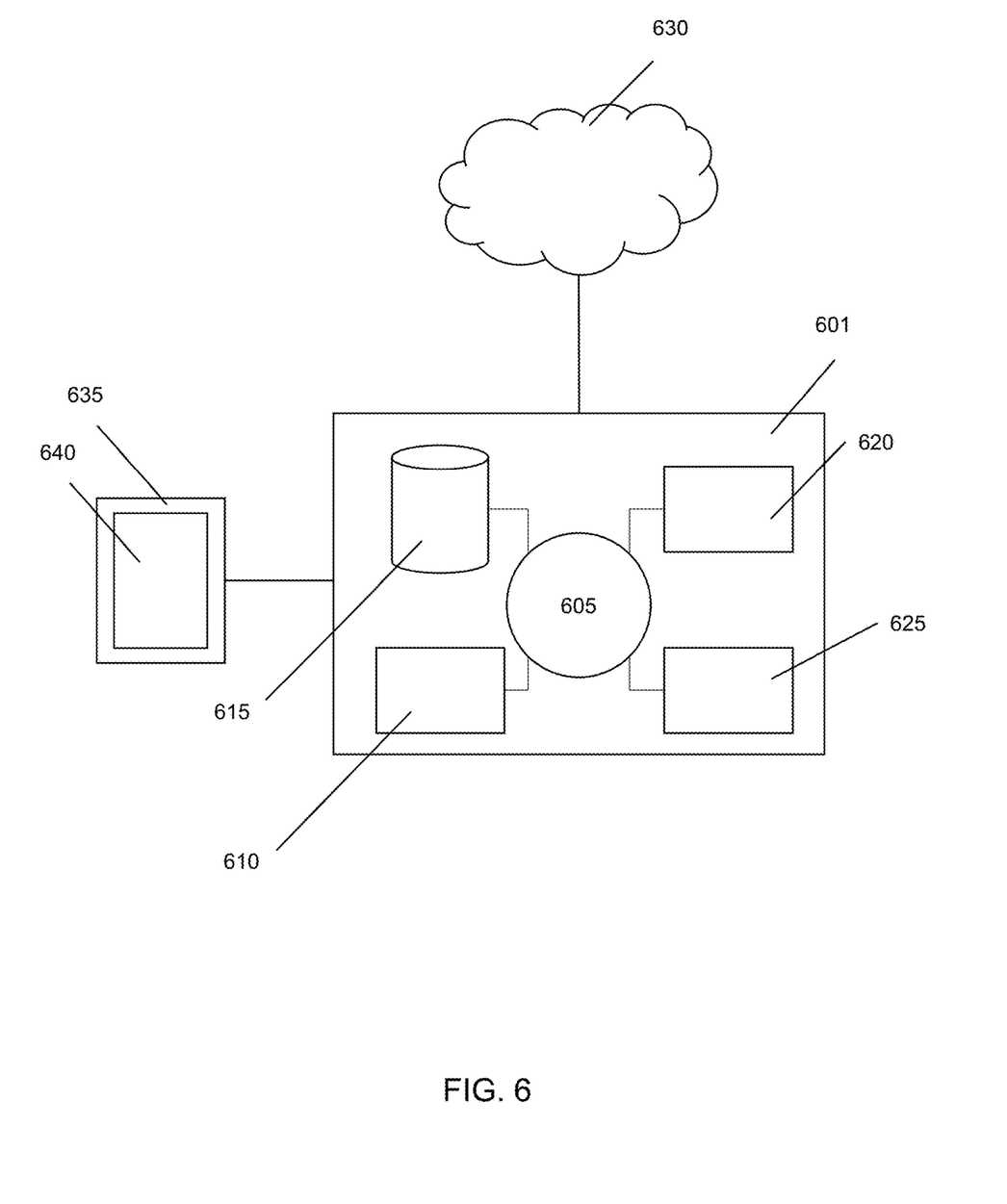
FIG. 6 shows a computer system that is programmed or otherwise configured to implement methods provided herein.

The present disclosure provides computer systems that are programmed to implement methods of the disclosure. FIG. 6 shows a computer system 601 that is programmed or otherwise configured to generate an output that indicates whether one or more solar modules will be covered by a shadow or shade, and to use the output to predict the power output of a solar plant or adjust the orientation of the solar modules. The computer system 601 can be an electronic device of a user or a computer system that is remotely located with respect to the electronic device. The electronic device can be a mobile electronic device.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine-readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processor adapted to execute the code or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. The algorithm can, for example, an edge detection algorithm or a solar tracking algorithm.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method comprising:
    (a) determining power outputs of a plurality of inverters at a first time point and a second time point, wherein each of the plurality of inverters is electrically coupled to one or more solar modules of a plurality of solar modules and wherein the second time point is later than the first time point;
    (b) processing the power outputs of the plurality of inverters to determine a trajectory of a shadow or shade moving over at least two solar modules in the plurality of solar modules;
    (c) generating a prediction of whether one or more solar modules in the plurality of solar modules will be covered by the shadow or shade at a third time point, wherein the third time point is later than the second time point; and (d) adjusting a power output of at least one inverter in the plurality of inverters based at least partially on the prediction.

2. The method of claim 1, further comprising generating a prediction of the power outputs of the plurality of inverters at the third time point.

3. The method of claim 2, further comprising determining a location among the plurality of solar modules that has a rate of change in power output that is higher than the average rate of change of power output on the plurality of solar modules, wherein a leading or trailing edge of the shadow or shade is determined to be at the location.

4. The method of claim 2, wherein each inverter of the plurality of inverters is electrically coupled to an equal number of solar modules.

5. The method of claim 2, further comprising adjusting a power output of the solar power plant based at least partially on the prediction of the power outputs of the plurality of inverters.

6. The method of claim 2, further comprising adjusting an orientation of at least one solar module in the plurality of solar modules based at least partially on the prediction of the power outputs of the plurality of inverters.

7. The method of claim 1, further comprising determining a position and/or shape of the shadow or shade at the first time step or the second time step.

8. The method of claim 1, further comprising determining a position and/or shape of the shadow or shade at the third time point.

9. The method of claim 1, further comprising determining a velocity of the shadow or shade as the shadow or shade is moving over the plurality of solar modules.

10. The method of claim 1, further comprising using wind speed data to determine the trajectory of the shadow or shade.

11. The method of claim 2, wherein the prediction of the power outputs of the plurality of inverters comprises a prediction of the power output of each inverter in the plurality of inverters.

12. The method of claim 2, wherein the plurality of solar modules is arranged in a grid.

13. A system comprising one or more processors configured to:

(a) determine power outputs of a plurality of inverters at a first time point and a second time point, wherein each of the plurality of inverters is electrically coupled to one or more solar modules of a plurality of solar modules and wherein the second time point is later than the first time point;

(b) process the power outputs of the plurality of inverters to determine a trajectory of a shadow or shade moving over at least two solar modules in the plurality of solar modules;

(c) generate a prediction of whether one or more solar modules in the plurality of solar modules will be covered by the shadow or shade at a third time point, wherein the third time point is later than the second time point; and (d) adjust a power output of at least one inverter in the plurality of inverters based at least partially on the prediction.

14. The system of claim 13, wherein the one or more processors are further configured to generate a prediction of the power outputs of the plurality of inverters at the third time point.

15. The system of claim 13, wherein the one or more processors are further configured to determine a location among the plurality of solar modules that has a rate of change in power output that is higher than the average rate of change of power output on the plurality of solar modules, wherein a leading or trailing edge of the shadow or shade is determined to be at the location.

16. The system of claim 13, wherein each inverter of the plurality of inverters is electrically coupled to an equal number of solar modules.

17. The system of claim 14, wherein the one or more processors are further configured to adjust a power output of the solar power plant based at least partially on the prediction of the power outputs of the plurality of inverters.

18. The system of claim 14, wherein the one or more processors are further configured to adjust an orientation of at least one solar module in the plurality of solar modules based at least partially on the prediction of power outputs of the plurality of inverters.

19. The system of claim 13, wherein the one or more processors are further configured to determine a position and/or shape of the shadow or shade at the first time step or the second time step.

20. The system of claim 13, wherein the controller is further configured to determine a position and/or shape of the shadow or shade at the third time step.

21. The system of claim 13, wherein the one or more processors are further configured to determine a velocity of the shadow or shade as the shadow or shade is moving over the plurality of solar modules.

22. The system of claim 13, wherein the one or more processors are further configured to use wind speed data to determine the trajectory of the shadow or shade.

23. The system of claim 14, wherein the prediction of the power outputs of the plurality of inverters comprises a prediction of the power output of each inverter in the plurality of inverters.

24. The system of claim 13, wherein the plurality of solar modules is arranged in a grid.

25. A non-transitory computer-readable storage medium having instructions stored thereon that, upon execution by a processor, cause the processor to perform operations comprising:

(a) determining power outputs of a plurality of inverters at a first time point and a second time point, wherein each of the plurality of inverters is electrically coupled to one or more solar modules of a plurality of solar modules and wherein the second time point is later than the first time point;

(b) processing the power outputs of the plurality of inverters to determine a trajectory of a shadow or shade moving over at least two solar modules in the plurality of solar modules;

(c) generating a prediction of whether one or more solar modules in the plurality of solar modules will be covered by the shadow or shade at a third time point, wherein the third time point is later than the second time point; and (d) adjusting a power output of at least one inverter in the plurality of inverters based at least partially on the prediction.

26. The non-transitory computer-readable storage medium of claim 25, wherein the operations further comprise generating a prediction of the power outputs of the plurality of inverters at the third time point.

27. The non-transitory computer-readable storage medium of claim 26, wherein the operations further comprise determining a location among the plurality of solar modules that has a rate of change in power output that is higher than the average rate of change of power output on the plurality of solar modules, wherein a leading or trailing edge of the shadow or shade is determined to be at the location.

28. The non-transitory computer-readable storage medium of claim 26, wherein each inverter of the plurality of inverters is electrically coupled to an equal number of solar modules.

29. The non-transitory computer-readable storage medium of claim 26, wherein the operations further comprise adjusting a power output of the solar power plant based at least partially on the prediction of the power outputs of the plurality of inverters.

30. The non-transitory computer-readable storage medium of claim 26, wherein the operations further comprise adjusting an orientation of at least one solar module in the plurality of solar modules based at least partially on the prediction of the power outputs of the plurality of inverters.

31. The non-transitory computer-readable storage medium of claim 25, wherein the operations further comprise determining a position and/or shape of the shadow or shade at the first time step or the second time step.

32. The non-transitory computer-readable storage medium of claim 25, wherein the operations further comprise determining a position and/or shape of the shadow or shade at the third time point.

33. The non-transitory computer-readable storage medium of claim 25, wherein the operations further comprise determining a velocity of the shadow or shade as the shadow or shade is moving over the plurality of solar modules.

34. The non-transitory computer-readable storage medium of claim 25, wherein the operations further comprise using wind speed data to determine the trajectory of the shadow or shade.

35. The non-transitory computer-readable storage medium of claim 25, wherein the prediction of the power outputs of the plurality of inverters comprises a prediction of the power output of each inverter in the plurality of inverters.

36. The non-transitory computer-readable storage medium of claim 25, wherein the plurality of solar modules is arranged in a grid.

* * * * *